April 19, 1966     KAMEKICHI SHIBA     3,246,524
APPARATUS FOR DETERMINING PERCENTAGE LIQUID IN A SAMPLE
Filed May 28, 1963     4 Sheets-Sheet 1
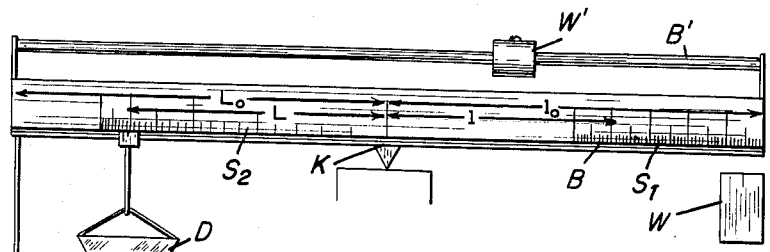
FIG 1
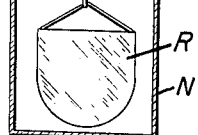
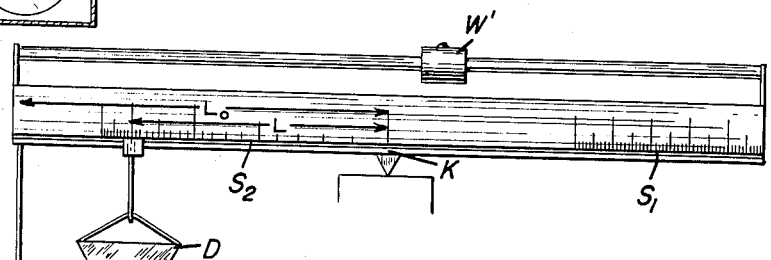
FIG 2
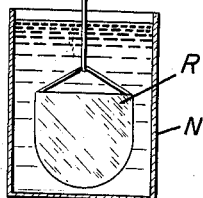
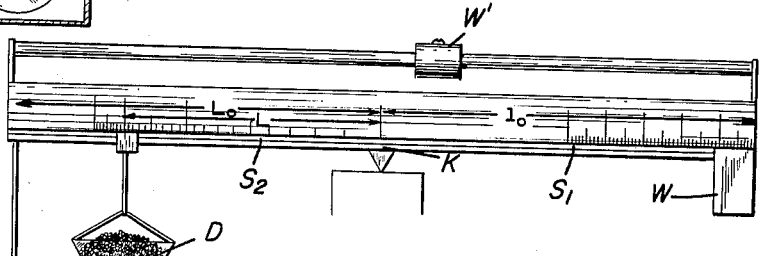
FIG 3
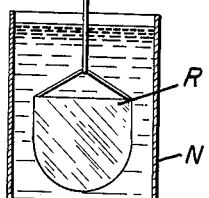
*Kamekichi Shiba*
INVENTOR
BY *Wenderoth, Lind & Ponack*
ATTORNEYS April 19, 1966  KAMEKICHI SHIBA  3,246,524
APPARATUS FOR DETERMINING PERCENTAGE LIQUID IN A SAMPLE
Filed May 28, 1963  4 Sheets-Sheet 2

*Kamekichi Shiba*
INVENTOR
BY *Wenderoth, Lind and Ponack*
ATTORNEYS

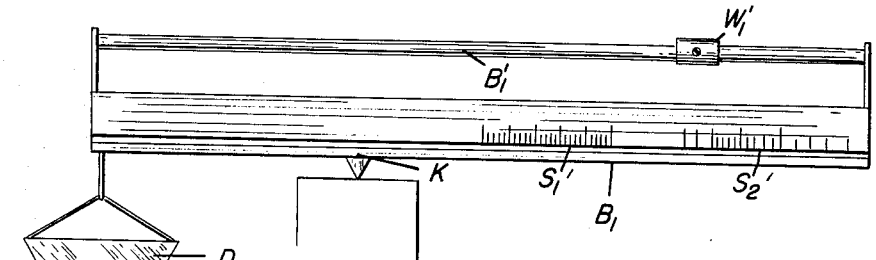
FIG 6
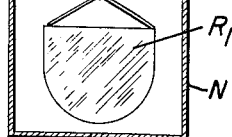
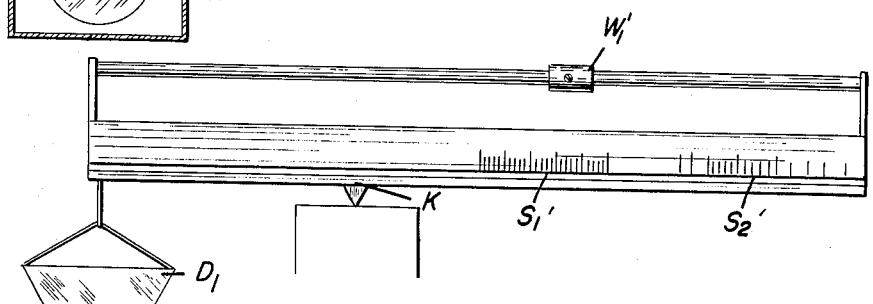
FIG 7
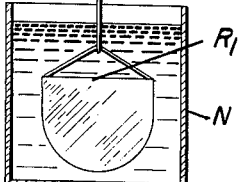
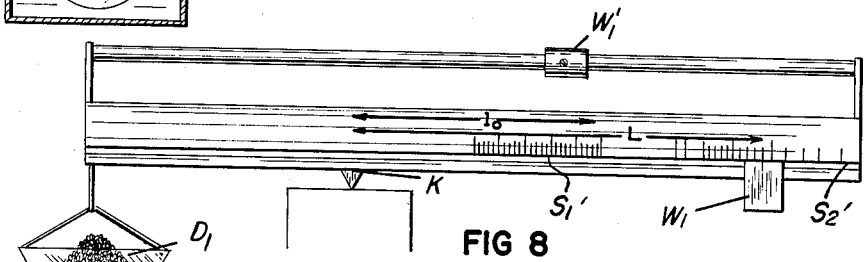
FIG 8
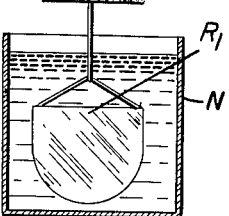
Kamekichi Shiba
INVENTOR

April 19, 1966  KAMEKICHI SHIBA  3,246,524
APPARATUS FOR DETERMINING PERCENTAGE LIQUID IN A SAMPLE Kamekichi Shiba
INVENTOR

United States Patent Office 3,246,524
Patented Apr. 19, 1966

3,246,524
APPARATUS FOR DETERMINING PERCENTAGE LIQUID IN A SAMPLE
Kamekichi Shiba, 159 Kago-Machi, Bunkyo-ku, Tokyo, Japan
Filed May 28, 1963, Ser. No. 283,801
Claims priority, application Japan, June 20, 1962, 37/25,122
2 Claims. (Cl. 73—435)

The present invention relates to an apparatus which is used for determining percentage liquid in a sample. More particularly it relates to a balancing device having an immersion container thereon and scales representing the specific gravity of the sample and the percentage liquid, from which the percentage liquid in the sample can be determined directly by immersing the immersion container containing the sample in a liquid the same as the liquid the percentage of which is being determined.

One way of determining the precentage liquid, for example water, in a sample is to weigh the sample, then heat it to drive out the moisture, reweigh the sample, and then calculate the loss and assume that it is loss of water. There are obvious drawbacks to this method, such as the inability to heat all substances so as to drive out any liquid therein, inability to determine precisely when all of the liquid has been driven out, and the inaccuracy in many cases of the assumption that the loss in weight is due to loss of liquid.

It is also possible to immerse the sample in a liquid the same as that in the sample, and using the density and volume relationships, calculate what part of the sample is liquid. This is a rather complex operation, however, and is time consuming when the liquid content of a number of samples must be determined.

It is an object of the present invention to provide an apparatus by which the percentage liquid in a sample can be determined quickly and easily.

It is a further object of the invention to provide an apparatus which can be operated to immerse the sample in liquid and by comparing the condition of the apparatus before and during the immersion, to determine directly the percentage liquid in the sample.

Other and further objects of the present invention will appear from the following specification and claims, taken together with the accompanying drawings, in which:

FIG. 1 is a schematic representation of a first embodiment of the apparatus according to the invention;

FIG. 2 is a schematic representation of the apparatus of FIG. 1 showing the manner of balancing the apparatus prior to placing a sample on the apparatus;

FIG. 3 is a schematic representation of the apparatus of FIG. 1 with a sample on the weighing pan and the apparatus in balance;

FIGS. 6–10 are schematic representations of a second embodiment of the apparatus according to the invention which correspond to FIGS. 1–5 respectively.

Figure 4:
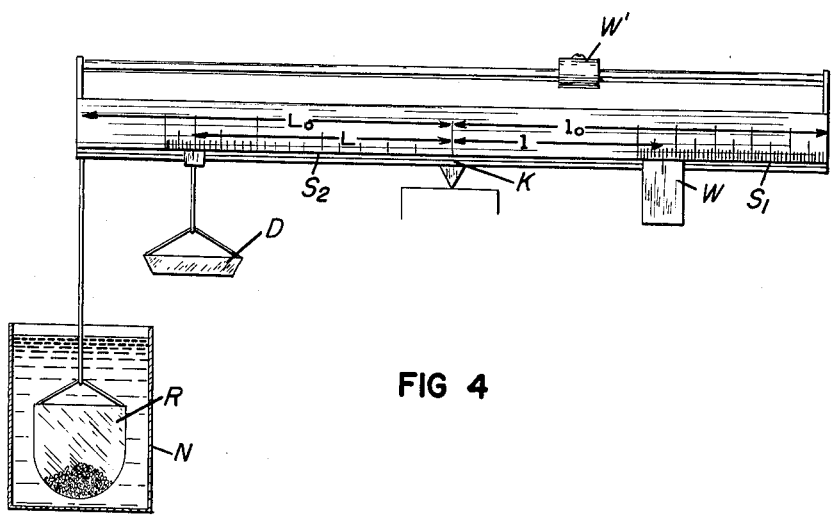
FIG. 4 is a schematic representation of the apparatus of FIG. 1 with the sample immersed in water in the immersion container.

The following description relates to determination of percent water in a sample.

The apparatus of the present invention is basically a balance which is used to compare the weight of the sample before and during immersion and to give the percent moisture in the sample directly on a scale on the balance.

An insoluble material of mass $m$ which has a moisture content $m_w$ has a total mass $M = m + m_w$. Therefore, if the moisture content is $x\%$, $x$ is given by the expression $$x = \frac{m_w}{M} \cdot 100 = \frac{m_w}{m + m_w} \cdot 100$$

If the true volume of the sample is V, and the densities of the insoluble material and water are $\rho$ and $\rho_w$, respectively, V is given by the expression $$V = \frac{M}{100}\left[\frac{100-x}{\rho} + \frac{x}{\rho_w}\right]$$

When a sample of the material is immersed in water, the mass of the sample appears to be reduced by the buoyance of the material to mass M', which can be expressed as follows:

$$M' = M - V\rho_w = M \cdot \frac{(100-x)}{100} \cdot \left(1 - \frac{\rho_w}{\rho}\right)$$

Therefore it follows that:

$$\frac{M}{M'} = \frac{100}{100-x} \cdot \frac{\rho}{\rho - \rho_w} \qquad (1)$$

Since $\rho$ and $\rho_w$ are either known or can be determined, the moisture content can be determined by measuring the ratio of $$\frac{M}{M'}$$

A quick and easy way of measuring this ratio is by means of a balance. A first embodiment of such a balance is shown in FIGS. 1–5, in which is shown a balance arm B pivotally mounted for pivoting movement about a fulcrum K. Tare balancing means is provided on said arm in the form of an auxiliary arm B' connected to said arm B above the arm B and having a slidable weight W' thereon. Suspended from one end of the balancing arm B is an immersion container R adapted to be immersed in a container N having water therein. A weight W is slidably and removably mounted on the other end of the balancing arm B along a percent moisture scale $S_1$ on the arm. Between the fulcrum K and the immersion container R is suspended a sample holding means D, shown schematically as a weighing pan. The sample holding means D in the embodiment shown is movable along a specific gravity scale $S_2$. The manner of determining the position and spacing of the divisions of the scales will be described hereinafter.

In use, the apparatus is first balanced with no sample on it, as shown in FIG. 2. The immersion container R is suspended from the one end of the arm and immersed in water, and the empty sample holding means D is suspended from a point on the scale $S_2$ corresponding to the specific gravity of the material being checked in its anhydrous form. The tare weight W' is then moved along the arm B' until the entire apparatus is balanced about the fulcrum K. The weight W' is then fixed in position.

The sample is then put on the sample holding means D and a corresponding weight W is placed on the origin of the $S_1$ scale on the other end of the arm B such that the arm B is again balanced as shown in FIG. 3. The balancing may be achieved either by adjusting the weight W or the amount of the sample.

The sample is then placed in the immersion container R, which has been removed from the water for this purpose, and the immersion container is again immersed in the water so that it is completely immersed and filled with water. Care must be taken that the entire sample remains in the container, and to insure this, the sample can first be mixed with water in the immersion container R before it is immersed. It is also desirable to stir the sample in the immersion container to remove air bubbles.

After the immersion container R is immersed in the water, the weight W is moved along the scale $S_1$ until the balance arm B is again balanced. The percent moisture in the sample is then read on the scale $S_1$.

The manner in which the scales are placed on the balancing arm B and their relationships to each other is best illustrated by considering the relationships of the positions of the various parts of the apparatus during its use. If the distance from the fulcrum K to the point from which the sample holding means D is suspended on the arm B is designated L, the distance from the fulcrum K to the suspension point of the immersion container R is designated $L_0$, the distance from the fulcrum K to the origin of the $S_1$ scale at which the weight W is first positioned is $l_0$, and the distance from the fulcrum K to the point at which the weight W is finally positioned is $l$, then the following moment relationships exist:

$$L \cdot M = l_0 \cdot W$$
$$L_0 M' = l \cdot W \qquad (2)$$

Therefore $$\frac{M}{M'} = \frac{L_0}{L} \cdot \frac{l_0}{l} \qquad (3)$$

Substituting in Equation 1, the following expression is obtained:

$$\frac{L_0}{L} \cdot \frac{l_0}{l} = \frac{100}{100-x} \cdot \frac{\rho}{\rho - \rho_w} \qquad (4)$$

If L is then made proportional to the specific gravity $$\frac{\rho}{\rho_w}$$

of the anhydrous sample according to the following expression:

$$L = k \cdot \frac{\rho - \rho_w}{\rho} = k\left(1 - \frac{\rho_w}{\rho}\right) \qquad (5)$$

where $k$ is an arbitrary proportional constant, then Equation 4 can be written as follows:

$$l = \frac{L_0 \cdot l_0}{k} \cdot \frac{(100-x)}{100} = a \cdot \frac{(100-x)}{100} \qquad (6)$$

Figure 5:
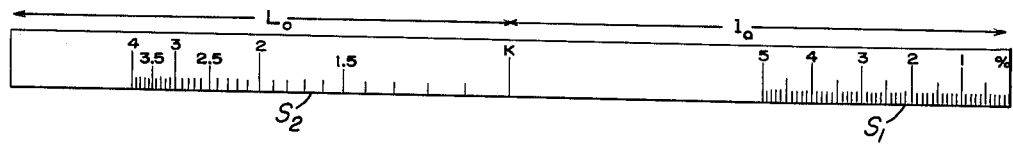
FIG. 5 is an enlarged view of the scales for the apparatus of FIG. 1.
Figure 9:
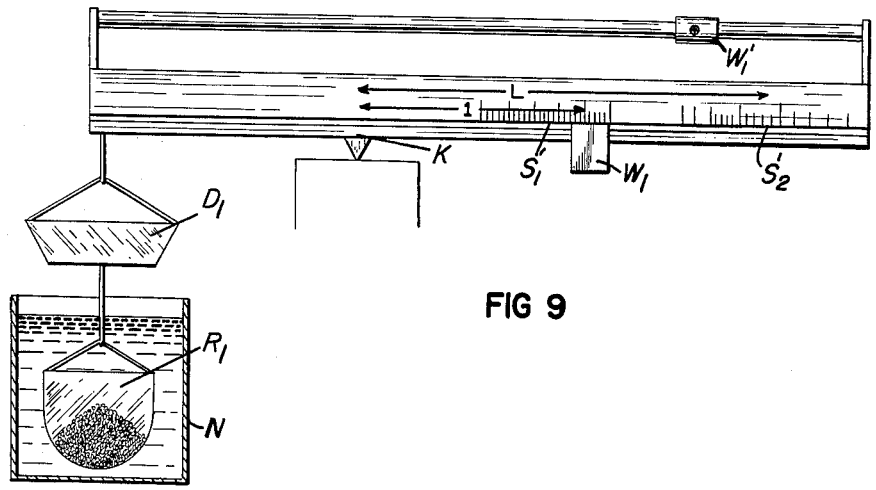
Figure 10:
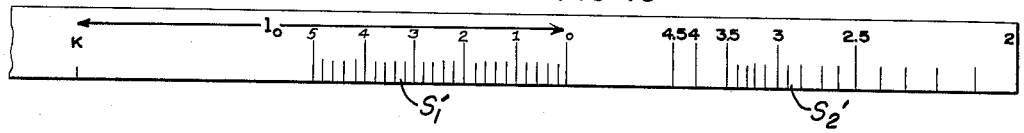

The specific gravity scale $S_2$, shown in detail in FIG. 5, is obtained by assuming that the proportionally constant $k$ is equal to $l_0$ and to L, which terms are fixed in the apparatus. The dimensions of the scale and the spacing of the divisions thereon can then be obtained from Equation 5. The relationship between the dimension $l$ and the percentage moisture $x$, as expressed in Equation 6, is independent of the specific gravity of the anhydrous sample, all of the terms in $a$ being dimensions of the apparatus.

Thus, by sliding the weight W along the percent moisture scale $S_2$ on balance arm B to balance the sample against its apparent weight M' when it is submerged, the percent moisture can be read directly from the balance position of the weight W.

It is not necessary that the scale be on opposite sides of the fulcrum, or that the sample be suspended from the balancing arm between the immersion container and the fulcrum prior to its immersion. An embodiment in which the sample holding means is placed at the same point on the balancing arm as the immersion container is shown in FIGS. 6–10. In this embodiment, as seen in FIG. 6, a balance arm $B_1$ is pivotally mounted for pivoting movement about a fulcrum K. Tare balancing means is provided on said arm in the form of an auxiliary arm $B'_1$ connected to the arm $B_1$ above the arm $B_1$ and having a slidable weight $W_1'$ thereon. Suspended from one end of the balancing arm is an immersion container $R_1$ which is adapted to be immersed in a container N having water therein. A sample holding means $D_1$, shown schematically as a weighing pan, is also suspended at the same point as the immersion container $R_1$. A weight $W_1$ is slidably and removably mounted on the other end of the balancing arm $B_1$ along a percent moisture scale $S_1'$ and a specific gravity scale $S_2'$.

In use, the apparatus is first balanced with no sample on it as shown in FIG. 7. The immersion container $R_1$ is suspended from one end of the arm and immersed in water, and the empty sample holding means $D_1$ is suspended from the same point as the immersion container. The tare weight $W_1'$ is then moved along the arm $B_1'$ until the entire apparatus is balanced about the fulcrum K. The weight $W_1'$ is then fixed in position.

The sample is then put in the sample holding means $D_1$ and a corresponding weight $W_1$ is placed on the $S_2'$ scale at the point on the scale corresponding to the specific gravity of the anhydrous form of the material being checked, and the arm $B_1$ is balanced, as shown in FIG. 8. The balancing may be achieved either by adjusting the weight $W_1$ or adjusting the amount of the sample.

The sample is then placed in the immersion container $R_1$ and it is immersed in the water in the same manner as for the embodiment of FIGS. 1–5. After the immersion, the weight $W_1$ is moved along the scale $S_1'$ until the balance arm $B_1$ is again balanced. The percent moisture in the sample is then read on the scale $S_1'$.

The manner in which the scales are placed on the balancing arm $B_1$ and their relationships to each other can be determined again by considering the relationships of the positions of the various parts of the apparatus during its use. If the distance from the fulcrum K to the point on the $S_2'$ specific gravity scale at which the weight $W_1$ is suspended to balance the sample in the sample holding means $D_1$ is designated L, and the distance from the fulcrum K to the point at which the weight $W_1$ is moved on the $S_1'$ percent moisture scale to balance the immersed sample is designed $l$, then $$\frac{M}{M'} = \frac{L}{l} \qquad (7)$$

Substituting ni Equation 1, the following expression is obtained:

$$\frac{L}{l} = \frac{100}{100-x} \cdot \frac{\rho}{\rho - \rho_w} = S \cdot \frac{100}{100-x} \qquad (8)$$

where $$s = \frac{\rho}{\rho - \rho_w}$$

and the reciprocal of $$s \text{ or } \frac{l}{s} = 1 - \frac{\rho_w}{\rho}$$

Equation 8 can be written as follows:

$$l = \frac{L}{s} \cdot \frac{100-x}{100} \qquad (9)$$

where $s$ is determined solely by the specific gravity of the anhydrous sample.

If L is then made proportional to the specific gravity of the anhydrous sample according to the following expression:

$$L = s \cdot l_0 = l_0 \cdot \frac{\rho}{\rho - \rho_w} \qquad (10)$$

then Equation 9 can be written as follows:

$$l = l_0 \cdot \frac{100-x}{100} \qquad (11)$$

where $l_0$ is a constant length from the fulcrum to the origin of the percent moisture scale.

Thus, the relationship between the dimension $l$ and the percentage moisture $x$, as expressed in Equation 11, is independent of the specific gravity of the anhydrous sample, all of the terms in $s$ being dimensions of the apparatus. Therefore, by sliding the weight $W_1$ along the percent moisture scale $S_1'$ on the balance arm $B_1$ to balance the sample against its apparent weight M' when it is submerged, the percent moisture can be read directly from the balance position of the weight $W_1$.

It will therefore be seen that there has been provided an apparatus in which the percent moisture of a sample can be determined without it even being necessary to weigh the sample, and without it being necessary to indulge in complicated computations. The sample is merely balanced on the balance arm, and after immersion and further balancing, the percent moisture is read directly from a scale on the balance arm.

The manner of using the apparatus set forth above is for the cases in which the sample to be checked is insoluble in water. However, the apparatus can also be used in a similar manner to determine the percent moisture in a sample of a material which is soluble in water. In this latter instance, a further computation must be made after the apparatus is used. To use the apparatus on a sample which is soluble in water, it is assumed that the water contained in the sample exists in the form of a saturated aqueous solution, and that the sample is mixture of dry solid and a saturated aqueous solution. The apparatus is used in the manner described above to determine the percentage of saturated aqueous solution in the sample instead of the actual moisture content, and the actual moisture content is then calculated using the amount of saturated aqueous solution in the sample.

It will also be understood that while the illustrations have been given with water as the liquid, the apparatus with the scales described can be used for any liquid as long as the scales are proportioned by the relationship of the density of the material without any liquid in it divided by the expression density of the material without any liquid in it minus the density of the liquid, or $$\frac{\rho}{\rho - \rho_z}$$

where $\rho$ is the density of the material without liquid and $\rho_z$ is the density of the liquid, and the liquid in which the sample is immersed is the same as the liquid in the sample.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. Apparatus for determining the percentage liquid in a sample, comprising a balance arm pivotally mounted for pivoting movement around a fulcrum, a tare balancing means on said arm for balancing said arm prior to placing a sample on said apparatus, an immersion container suspended from one end of said arm and adapted to be immersed in a body of liquid the same as that the percentage of which is being determined, a weight removably and slidably mounted on the other end of said arm, and two scales on said balance arm, the first scale being a specific gravity scale representing the specific gravity of the form of the sample without any liquid in it, and having its origin at the fulcrum and extending toward said one end of said arm, a sample holding means suspended from said arm and movable along said specific gravity scale, and the second scale being a percent liquid scale representing the percentage of liquid in the sample and having its origin at said other end of said arm, the distances L of points on the specific gravity scale from the fulcrum at the origin of the specific gravity scale for different specific gravities being proportional to the expression $$\frac{\rho - \rho_w}{\rho}$$

and the distances $l$ of points on the percentage liquid scale from the fulcrum for different percentages being proportional to the expression $$\frac{100 - x}{100}$$

where $\rho$=density of the sample without any liquid in it, $\rho_w$=the density of the liquid, and $x$ is the percent of liquid in the sample, the relationship between L and $l$ being $$\frac{L_o}{L} \cdot \frac{l_o}{l} = \frac{100}{100-x} \cdot \frac{\rho}{\rho - \rho_w}$$

where $L_o$ is the length of the balance arm from the fulcrum to the point from which said immersion container is suspended, and $l_o$ is the length of the balance arm from the fulcrum to the origin of the percent liquid scale.

2. Apparatus for determining the percentage liquid in a sample, comprising a balance arm pivotally mounted for pivoting movement around a fulcrum, a tare balancing means on said apparatus, an immersion container suspended from one end of said arm and adapted to be immersed in a body of liquid the same as that the percentage of which is being determined, a weight removably and slidably mounted on the arm on the other side of the fulcrum from said one end, a sample holding means suspended from said one end of said arm, and two scales on said balance arm, the first scale being a specific gravity scale representing the specific gravity in the form of the sample without any liquid in it and having its origin at the other end of said arm, and the second scale being a percent liquid scale representing the percentage of liquid in the sample and having its origin spaced inwardly from the said other end of said arm, the distances L of points on the specific gravity scale from the fulcrum for different specific gravities being proportional to the expression $$\frac{\rho}{\rho - \rho_w}$$

and the distances $l$ of the points on the percentage liquid scale from the fulcrum for different percentages being proportional to the expression $$\frac{100 - x}{100}$$

where $\rho$=density in the form of the sample without any liquid in it, $\rho_w$=the density of the liquid, and $x$ is the percent of liquid in the sample, the relationship between L and $l$ being $$\frac{L}{l} = \frac{100}{100-x} \cdot \frac{\rho}{\rho - \rho_w}$$

References Cited by the Examiner

UNITED STATES PATENTS

| | | | |
|---|---|---|---|
| Re. 22,253 | 1/1943 | Mashbir et al. | 73—435 |
| 172,581 | 1/1876 | Parish | 73—436 |
| 2,291,771 | 8/1942 | Stancliffe | 73—435 |

FOREIGN PATENTS 444,077  3/1936  Great Britain.

RICHARD C. QUEISSER, *Primary Examiner.*

J. FISHER, *Assistant Examiner.*